(12) United States Patent
T S (10) Patent No.: US 9,438,545 B2
(45) Date of Patent: Sep. 6, 2016

(54) MESSAGE-BASED COLLABORATION

(71) Applicant: Sabarish T S, Bangalore (IN)

(72) Inventor: Sabarish T S, Bangalore (IN)

(73) Assignee: SAP SE, Walldorf (DE)

( * ) Notice: Subject to any disclaimer, the term of this patent is extended or adjusted under 35 U.S.C. 154(b) by 215 days.

(21) Appl. No.: 14/148,953

(22) Filed: Jan. 7, 2014

(65) Prior Publication Data
US 2015/0195219 A1    Jul. 9, 2015

(51) Int. Cl.
    *G06F 15/16*      (2006.01)
    *H04L 12/58*      (2006.01)

(52) U.S. Cl.
    CPC .................. *H04L 51/066* (2013.01)

(58) Field of Classification Search
    CPC ..... H04L 51/00; H04L 51/043; H04L 12/58; G06Q 10/07; G06Q 17/30076
    See application file for complete search history.

(56) References Cited

U.S. PATENT DOCUMENTS

| | | | | |
|---|---|---|---|---|
| 8,126,975 | B2 * | 2/2012 | Hoyne ................... | G06Q 10/10 709/206 |
| 2002/0099775 | A1 * | 7/2002 | Gupta ................. | G06Q 10/107 709/205 |
| 2002/0147745 | A1 * | 10/2002 | Houben ................ | G06F 17/272 715/234 |
| 2006/0041502 | A1 * | 2/2006 | Blair ..................... | G06F 17/227 705/37 |
| 2006/0178893 | A1 * | 8/2006 | McCallie, Jr. ....... | G06F 19/3425 709/206 |
| 2007/0233785 | A1 * | 10/2007 | Abraham ............. | G06Q 10/107 709/204 |
| 2010/0077317 | A1 * | 3/2010 | Kritt ..................... | G06Q 10/107 709/206 |
| 2012/0137235 | A1 | 5/2012 | T S | |
| 2013/0159484 | A1 | 6/2013 | T S | |

* cited by examiner

*Primary Examiner* — Liangche A Wang
*Assistant Examiner* — Ayele Woldemariam
(74) *Attorney, Agent, or Firm* — Fish & Richardson P.C.

(57) ABSTRACT

Techniques for providing a message-based collaboration including receiving, from a message communications system, an electronic message, the electronic message including content, and associated with one or more characteristics; comparing at least one of the one or more characteristics of the electronic message to one or more triggering rules; based on the comparing, converting the content of the electronic message to a format of a collaboration communications system; and preparing a collaboration message employed within the collaboration communications system for electronic transmission that includes the converted content of the electronic message.

19 Claims, 5 Drawing Sheets

MESSAGE-BASED COLLABORATION

TECHNICAL BACKGROUND

This disclosure relates to a message-based collaboration and, more particularly, converting email-based content for collaboration communications.

BACKGROUND

Collaboration communications systems facilitate conversational engagement by users in a structured manner. Additionally, collaboration communications systems allow users to view existing conversations and share information with a community of people. Collaboration communications systems gained further importance in organizations where key contributions are done by knowledge workers (e.g., the IT sector), as this was perceived as a place of information capturing and sharing.

SUMMARY

The present disclosure relates to computer-implemented methods, software, and systems for email-based collaboration. In some implementations, a message-based (e.g., email-based) collaboration is provided. In some examples, an electronic message is received that includes content, and is associated with one or more characteristics. The characteristics of the electronic message are compared to triggering rules, and based on the comparing, the content of the electronic message is converted to a format of a collaboration communications system. A collaboration message is prepared that is employed within the collaboration communications system for electronic transmission. The collaboration message includes the converted content of the electronic message.

Other general implementations include corresponding computer systems, apparatus, and computer programs recorded on one or more computer storage devices, each configured to perform the actions of the methods. A system of one or more computers can be configured to perform operations to perform the actions. One or more computer programs can be configured to perform particular operations or actions by virtue of including instructions that, when executed by data processing apparatus, cause the apparatus to perform the actions.

In a first aspect combinable with any of the general implementations, receiving an update to the content of the electronic message, and in response, updating the collaboration message to include the updated content.

In a second aspect combinable with any of the previous aspects, identifying a message identifier (ID) associated with the electronic message; identifying a collaboration identifier (ID) associated with the collaboration message; providing a mapping between the message ID and the collaboration ID; and updating the collaboration message to include the updated content based on the mapping.

In a third aspect combinable with any of the previous aspects, based on the comparing, providing a suggestion to an author associated with the electronic message to convert the content of the electronic message to the format of the collaboration communications system; based on the suggestion, receiving, from the author, an indication to convert the content; and based on the indication, converting the content of the electronic message to the format of the collaboration communications system.

In a fourth aspect combinable with any of the previous aspects, identifying a number of days associated with the electronic message; comparing the number of days with an associated trigger rule of the one or more triggering rules; and based on the comparing, determining that the number of days satisfies the associated triggering rule, and in response, providing a suggestion to an author associated with the electronic message to convert the electronic message to the format of the collaboration communications system.

In a fifth aspect combinable with any of the previous aspects, identifying a number of a total number of communications associated with the electronic message; comparing the number of communications with an associated triggering rule of the one or more triggering rules; and based on the comparing, determining that the number of communications satisfies the associated triggering rule, and in response, providing a suggestion to an author associated with the electronic message to convert the electronic message to the format of the collaboration communications system.

In a sixth aspect combinable with any of the previous aspects identifying a number of a total number of participants associated with the electronic message; comparing the number of participants with an associated triggering rule of the one or more triggering rules; and based on the comparing, determining that the number of participants satisfies the associated triggering rule, and in response, providing a suggestion to an author associated with the electronic message to convert the electronic message to the format of the collaboration communications system.

In a seventh aspect combinable with any of the previous aspects, displaying the collaboration message within the message communications system.

In an eight aspect combinable with any of the previous aspects, comparing at least one of the one more characteristics of the electronic message to one or more collaboration rules, the collaboration rules defining parameters for collaboration messages; and based on the comparing, determining that the electronic message satisfies the collaboration rules, and in response, providing the collaboration message.

Various implementations of a computing system according to the present disclosure may have one or more of the following features. For example, a seamless interface of converting an email conversation is provided that is relevant to participants outside of an message communications system; allowing users to maintain working with an email client; and allowing the user to push the email conversation to a collaboration platform while still continuing to work with the mail client. As a result, users do not have to shift technologies or change their user behavior, which may be a deterrence to move to a collaboration platform.

The details of one or more implementations of the subject matter of this specification are set forth in the accompanying drawings and the description below. Other features, aspects, and advantages of the subject matter will become apparent from the description, the drawings, and the claims.

DETAILED DESCRIPTION

In some implementations, a message-based (e.g., email-based) collaboration is provided. In some examples, an electronic message is received that includes content, and is associated with one or more characteristics. The characteristics of the electronic message are compared to triggering rules, and based on the comparing, the content of the electronic message is converted to a format of a collaboration communications system. A collaboration message is prepared that is employed within the collaboration communications system for electronic transmission. The collaboration message includes the converted content of the electronic message.

Figure 1:
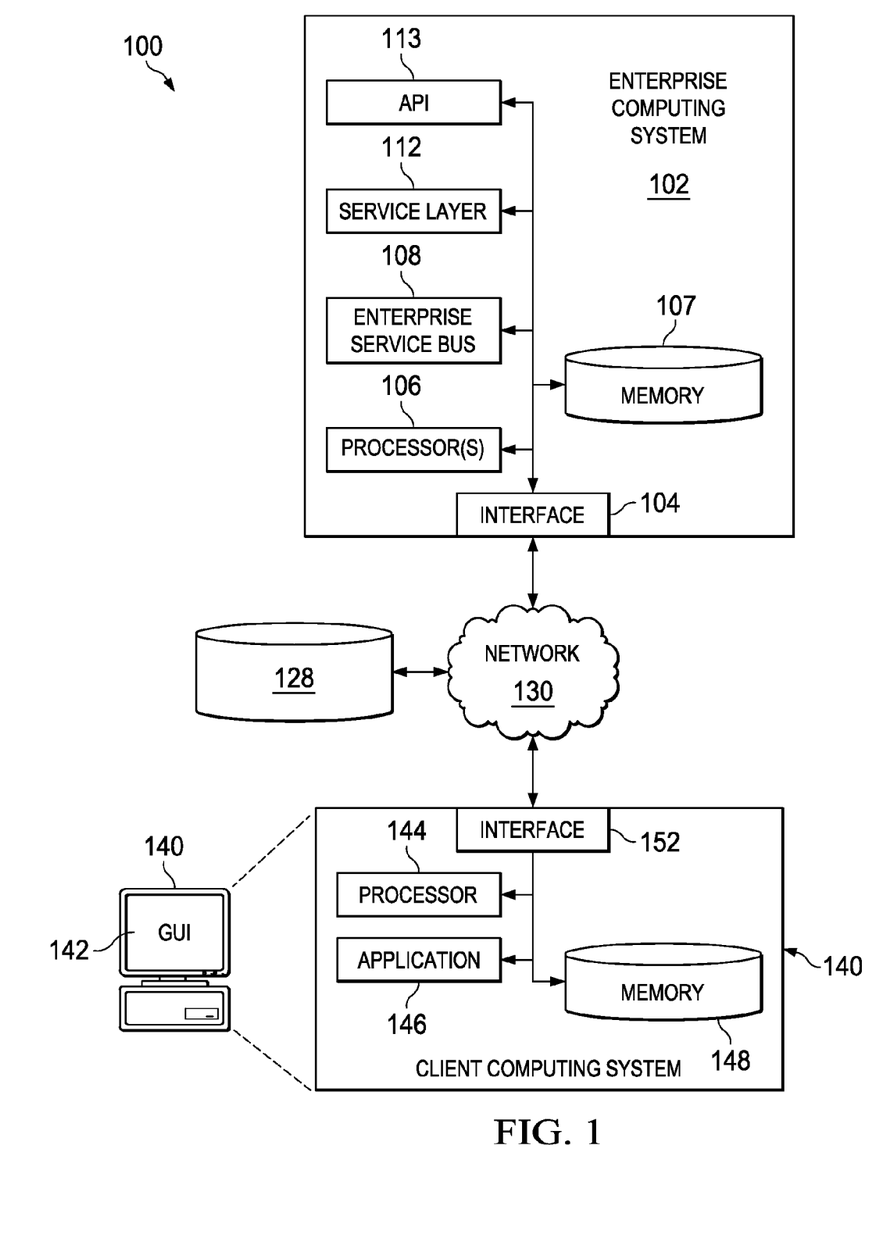
FIG. 1 illustrates an example distributed computing system for a message-based collaboration.

FIG. 1 illustrates an example distributed computing system 100 for a message-based (e.g., email-based) collaboration. In some examples, the illustrated enterprise server computing system 102 may store a plurality of various hosted applications, while in some examples, the enterprise server computing system 102 may be a dedicated server meant to store and execute only a single hosted application. In some instances, the enterprise server computing system 102 may comprise a web server, where the hosted applications represent one or more web-based applications accessed and executed via the network 130 by the client computing system 140 to perform the programmed tasks or operations of the hosted application.

At a high level, the illustrated enterprise server computing system 102 comprises an electronic computing device operable to receive, transmit, process, store, or manage data and information associated with the distributed computing system 100. Specifically, the enterprise server computing system 102 illustrated in FIG. 1 is responsible for receiving application requests from one or more client applications associated with the client computing system 140 of the distributed computing system 100 and responding to the received requests by processing said requests in the associated hosted application, and sending the appropriate response from the hosted application back to the requesting client application. In addition to requests from the client computing system 140 illustrated in FIG. 1, requests associated with the hosted applications may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates a single enterprise server computing system 102, the distributed computing system 100 can be implemented using two or more servers, as well as computers other than servers, including a server pool. In some examples, the enterprise server computing system 102 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, the enterprise server computing system 102 may be adapted to execute any operating system, including Linux, UNIX, Windows, Mac OS, or any other suitable operating system.

The illustrated enterprise server computing system 102 further includes an interface 104. Although illustrated as a single interface 104 in FIG. 1, two or more interfaces 104 may be used according to particular needs, desires, or particular implementations of the example distributed computing system 100. The interface 104 is used by the enterprise server computing system 102 for communicating with other systems in a distributed environment—including within the example distributed computing system 100—connected to the network 130; for example, the client computing system 140 as well as other systems communicably coupled to the network 130 (not illustrated). Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated example distributed computing system 100.

Regardless of the particular implementation, "software" may include computer-readable instructions, firmware, wired or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java, Visual Basic, ABAP, assembler, Perl, any suitable version of 4GL, as well as others. While portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate.

The illustrated enterprise server computing system 102 further includes a processor 106. Although illustrated as a single processor 106 in FIG. 1, two or more processors may be used according to particular needs, desires, or particular implementations of the example distributed computing system 100. The processor 106 may be a central processing unit (CPU), a blade, an application specific integrated circuit (ASIC), a field-programmable gate array (FPGA), or another suitable component. Generally, the processor 106 executes instructions and manipulates data to perform the operations of the enterprise server computing system 102. Specifically, the processor 106 executes the functionality required to receive and respond to requests from the client computing system 140.

The illustrated enterprise server computing system 102 also includes a memory 107. Although illustrated as a single memory 107 in FIG. 1, two or more memories may be used according to particular needs, desires, or particular implementations of the example distributed computing system 100. While memory 107 is illustrated as an integral component of the enterprise server computing system 102, in some implementations, the memory 107 can be external to the enterprise server computing system 102 and/or the example distributed computing system 100. The memory 107 may include any memory or database module and may take the form of volatile or non-volatile memory including, without limitation, magnetic media, optical media, random access memory (RAM), read-only memory (ROM), removable media, or any other suitable local or remote memory component. The memory 107 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the enterprise computing system 102. Additionally, the memory 107 may include any other appropriate data, such as VPN applications, firmware logs and policies, firewall policies, a security or access log, print or other reporting files, as well as others.

The illustrated enterprise server computing system 102 further includes a service layer 112. The service layer 112 provides software services to the example distributed computing system 100. The functionality of the enterprise server computing system 102 may be accessible for all service consumers using this service layer. For example, in one implementation, the client computing system 140 can utilize the service layer 112 to communicate with the design engine 118. Software services provide reusable, defined business functionalities through a defined interface. For example, the interface may be software written in extensible markup language (XML) or other suitable language. While illustrated as an integrated component of the enterprise server computing system 102 in the example distributed computing system 100, alternative implementations may illustrate the service layer 112 as a stand-alone component in relation to other components of the example distributed computing system 100. Moreover, any or all parts of the service layer 112 may be implemented as child or sub-modules of another software module, enterprise application, or hardware module without departing from the scope of this disclosure.

The illustrated enterprise server computing system 102 further includes an application programming interface (API) 113. In some implementations, the API 113 can be used to interface between the design engine 118 and one or more components of the enterprise server computing system 102 or other components of the example distributed computing system 100, both hardware and software. For example, in some implementations, the design engine 118 can utilize the API 113 to communicate with the client computing system 140. The API 113 may include specifications for routines, data structures, and object classes. The API 113 may be either computer language independent or dependent and refer to a complete interface, a single function, or even a set of APIs. While illustrated as an integrated component of the enterprise server computing system 102 in the example distributed computing system 100, alternative implementations may illustrate the API 113 as a stand-alone component in relation to other components of the example distributed computing system 100. Moreover, any or all parts of the API 113 may be implemented as child or sub-modules of another software module, enterprise application, or hardware module without departing from the scope of this disclosure.

The client computing system 140 may be any computing device operable to connect to or communicate with at least the enterprise server computing system 102 using the network 130. In general, the client computing system 140 comprises a computer operable to receive, transmit, process, and store any appropriate data associated with the example distributed computing system 100. The illustrated client computing system 140 further includes an application 146. The application 146 is any type of application that allows the client computing system 140 to request and view content on the client computing system 140. In some implementations, the application 146 can be and/or include a web browser. In some implementations, the application 146 can use parameters, metadata, and other information received at launch to access a particular set of data from the enterprise server computing system 102. Once a particular application 146 is launched, a user may interactively process a task, event, or other information associated with the enterprise server computing system 102. Further, although illustrated as a single application 146, the application 146 may be implemented as multiple applications in the client computing system 140.

The illustrated client computing system 140 further includes an interface 152, a processor 144, and a memory 148. The interface 152 is used by the client computing system 140 for communicating with other systems in a distributed environment—including within the example distributed computing system 100—connected to the network 130; for example, the enterprise server computing system 102 as well as other systems communicably coupled to the network 130 (not illustrated). The interface 152 may also be consistent with the above-described interface 104 of the enterprise server computing system 102 or other interfaces within the example distributed computing system 100.

The processor 144 may be consistent with the above-described processor 106 of the enterprise server computing system 102 or other processors within the example distributed computing system 100. Specifically, the processor 144 executes instructions and manipulates data to perform the operations of the client computing system 140, including the functionality required to send requests to the enterprise server computing system 102 and to receive and process responses from the enterprise server computing system 102. The memory 148 may be consistent with the above-described memory 107 of the enterprise server computing system 102 or other memories within the example distributed computing system 100 but storing objects and/or data associated with the purposes of the client computing system 140.

Further, the illustrated client computing system 140 includes a GUI 142. The GUI 142 interfaces with at least a portion of the example distributed computing system 100 for any suitable purpose, including generating a visual representation of a web browser. In particular, the GUI 142 may be used to view and navigate various web pages located both internally and externally to the enterprise server computing system 102. Generally, through the GUI 142, an enterprise server computing system 102 user is provided with an efficient and user-friendly presentation of data provided by or communicated within the example distributed computing system 100.

There may be any number of client computing systems 140 associated with, or external to, the example distributed computing system 100. For example, while the illustrated example distributed computing system 100 includes one client computing system 140 communicably coupled to the enterprise server computing system 102 using network 130, alternative implementations of the example distributed computing system 100 may include any number of client computing systems 140 suitable for the purposes of the example distributed computing system 100. Additionally, there may also be one or more client computing systems 140 external to the illustrated portion of the example distributed computing system 100 that are capable of interacting with the example distributed computing system 100 using the network 130. Moreover, while the client computing system 140 is described in terms of being used by a single user, this disclosure contemplates that many users may use one computer, or that one user may use multiple computers.

The illustrated client computing system 140 is intended to encompass any computing device such as a desktop computer, laptop/notebook computer, wireless data port, smart phone, personal data assistant (PDA), tablet computing device, one or more processors within these devices, or any other suitable processing device. For example, the client computing system 140 may comprise a computer that includes an input device, such as a keypad, touch screen, or other device that can accept user information, and an output device that conveys information associated with the operation of the enterprise server computing system 102 or the client computing system 140 itself, including digital data, visual information, or a GUI 142, as shown with respect to the client computing system 140.

The illustrated distributed computing system 100 further includes a repository 128. In some implementations, the repository 128 is an in-memory repository. The repository 128 can be a cloud-based storage medium. For example, the repository 128 can be networked online storage where data is stored on virtualized pools of storage.

With respect to the network 130, generally, the illustrated network 130 facilitates wireless or wireline communications between the components of the distributed computing system 100 (e.g., between the computing systems 102 and 140), as well as with any other local or remote computer, such as additional clients, servers, or other devices communicably coupled to network 130 but not illustrated in FIG. 1. The network 130 is illustrated as a single network in FIG. 1, but may be a continuous or discontinuous network without departing from the scope of this disclosure, so long as at least a portion of the network 130 may facilitate communications between senders and recipients. The network 130 may be all or a portion of an enterprise or secured network, while in another instance at least a portion of the network 130 may represent a connection to the Internet.

In some instances, a portion of the network 130 may be a virtual private network (VPN), such as, for example, the connection between the client computing system 140 and the enterprise server computing system 102. Further, all or a portion of the network 130 can comprise either a wireline or wireless link. Example wireless links may include 802.11a/b/g/n, 802.20, WiMax, and/or any other appropriate wireless link. In other words, the network 130 encompasses any internal or external network, networks, sub-network, or combination thereof operable to facilitate communications between various computing components inside and outside the illustrated distributed computing system 100. The network 130 may communicate, for example, Internet Protocol (IP) packets, Frame Relay frames, Asynchronous Transfer Mode (ATM) cells, voice, video, data, and other suitable information between network addresses. The network 130 may also include one or more local area networks (LANs), radio access networks (RANs), metropolitan area networks (MANs), wide area networks (WANs), all or a portion of the Internet, and/or any other communication system or systems at one or more locations.

Figure 2:
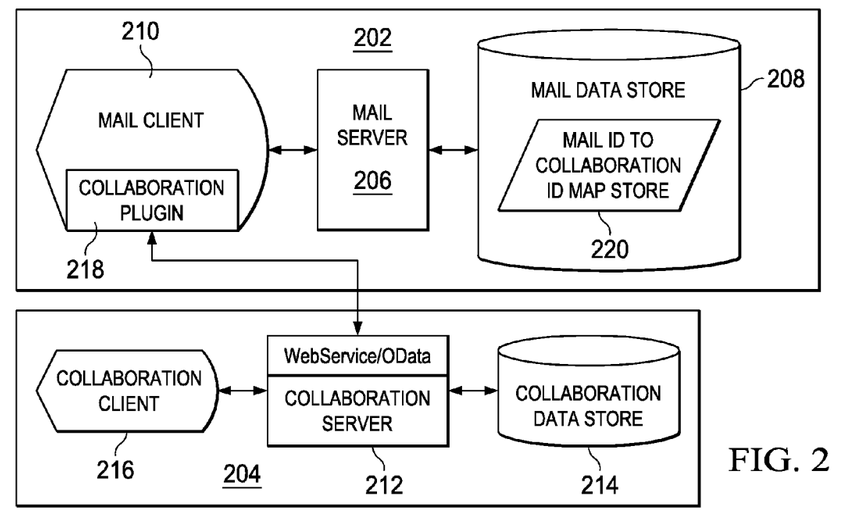
FIG. 2 illustrates an example system for a message-based collaboration.

FIG. 2 illustrates an example system 200 for providing a message-based (e.g., email-based) collaboration. System 200 includes a message communications system 202 and a collaboration communications system 204. The message communications system 202 includes a mail server computing system 206, a mail data store (e.g., repository) 208, and a mail client 210. The collaboration communications system 204 includes a collaboration server computing system 212, a collaboration data store (e.g., a repository) 214, and a collaboration client 216.

The mail server computing system 206 is in communication with the mail data store 208 (e.g., over the network 130). The mail data store 208 stores one or more electronic messages (e.g., in a database). In some examples, the mail data store 208 further includes metadata associated with the electronic messages, or other message-based data (e.g., email-based data). In some examples, the mail data store 208 provides one or more electronic messages to the mail server computing system 206. For example, the mail data store 208 provides the one or more electronic messages in response to a request from the mail server computing system 206, or automatically. In some examples, the mail data store 208 provides the one or more electronic messages to the mail server computing system 206 according to one or more rules (e.g., predetermined criteria).

The mail server computing system 206 is further in communication with the mail client 210 (e.g., over the network 130). The mail server computing system 206 provides the one or more electronic messages (or a subset of the one or more electronic messages) to the mail client 210. For example, the mail server computing system 206 provides the one or more electronic messages in response to a request from the mail client 210, or automatically. In some examples, the mail client includes a locally-stored email client, a web-based email client, or a combination thereof.

The mail client 210 includes a collaboration plugin 218 (e.g., a collaboration computing module or a collaboration engine). The collaboration plugin 218 provides a message-based (e.g., email-based) collaboration between users. Specifically, in some implementations, the collaboration plugin 218 receives an electronic message (e.g., from the mail server computing system 206), the electronic message including content and is associated with one or more characteristics. In some examples, the collaboration plugin 218 compares a characteristic of the electronic message to triggering rules. Based on the comparison, the content of the electronic message is converted to a format of the collaboration communications system 204. Further, a collaboration message is prepared that is employed within the collaboration communications system 204 for electronic transmission. The collaboration message includes the converted content of the electronic message.

In some implementations, an electronic message is received from a message communications system. Specifically, in some examples, the collaboration plugin 218 receives an electronic message (e.g., an electronic mail, or email, message or other electronic message) from the mail server computing system 206. The electronic message includes content, and is associated with one or more characteristics. For example, the content can include text of the electronic communication (e.g., the "body" of the electronic communication), text of the subject line of the electronic message, or other content-based information. Additionally, for example, the one or more characteristics can include metadata that is associated with the electronic message, or other identifying properties of the electronic message. For example, the one or more characteristics can include, a number of days associated with the electronic message, a total number of communications associated with the electronic message, or a total number of participants associated with the electronic message.

In some examples, the electronic message includes two or more related electronic messages. In some examples, the electronic message can include two or more conversations. For example, the electronic message can include an email "chain" or an email "thread" (e.g., a threaded email message). In some examples, the electronic message can include multiple mail messages that have been exchanged between multiple users over multiple days.

In some implementations, at least one of the one or more characteristics of the electronic message (e.g., email message) is compared to one or more triggering rules. Specifically, in some examples, the collaboration plugin 218 compares at least one or of the one or more characteristics of the electronic message with one or more triggering rules. For example, for a particular characteristic of the electronic message, the collaboration plugin 218 identifies a triggering rule associated with the particular characteristic. In some examples, the particular characteristic of the electronic message is associated with two or more triggering rules. In some examples, a particular triggering rule is associated with two or more characteristics of the electronic message.

In some examples, comparing at least one of the one or more characteristics of the electronic message with one or more triggering rules includes identifying a number of days associated with the electronic message. For example, the electronic message (e.g., email message) was initially generated 10 days ago (from a current date), or the last update to the electronic message (e.g., a reply to the electronic message, or a forward of the electronic message) was 10 days ago (from a current date). The number of days is compared with an associated triggering rule of the one or more triggering rules. For example, a triggering rule associated with the number of days can include a threshold number of days (e.g., an "age" threshold) of 8 days. Based on the comparing, it is determined that that number of days satisfies the associated triggering rule. For example, the number of days associated with the electronic message (e.g., 10 days) satisfies the associated triggering rule (e.g., greater than the threshold number of 8 days). In response, a suggestion is provided to an author associated with the electronic message (e.g., a user providing content to the electronic message) to convert the electronic message to a format of the collaboration communications system 204. For example, the suggestion can be provided through the GUI 142, and particularly, displayed within a displayable module of the email client 210 that is displayed through the GUI 142. The suggestion can include a hyperlink to an external website (e.g., external to the message communications system 202) to facilitate converting the electronic message to the format of the collaboration communications system 204, described further below. However, the suggestion can include other means, including an email to the user, a pop-up window, a notification (e.g., push), or other notification means.

In some examples, comparing at least one of the one or more characteristics of the electronic message with one or more triggering rules includes identifying a number of total communications associated with the electronic message. For example, the electronic message (e.g., email message) is associated with 21 conversations (e.g., communications) between participants of the electronic message. That is, the electronic message has been communicated between the participants (e.g., replies) 21 times. For example, each conversation (e.g., reply) includes the content of the previous reply and additional content added with the current communication (e.g., response to a previous communication). The total number of communications is compared with an associated triggering rule of the one or more triggering rules. For example, a triggering rule associated with the number of communications can include a threshold number of communications (e.g., a threshold) of 15 communications. Based on the comparison, it is determined that that number of communications satisfies the associated triggering rule. For example, the number of communications associated with the electronic message (e.g., 21 communications) satisfies the associated triggering rule (e.g., greater than the threshold number of 15 communications). In response, a suggestion is provided to an author associated with the electronic message (e.g., a user providing content to the electronic message) to convert the electronic message to a format of the collaboration communications system 204.

In some examples, comparing at least one of the one or more characteristics of the electronic message with one or more triggering rules includes identifying a number of total participants associated with the electronic message. For example, the electronic message (e.g., email message) is associated with 7 participants (e.g., authors, or users) of the electronic message. That is, the electronic message has been communicated between the 7 participants (e.g., replies, forwards, or other email-based activity). The total number of participants is compared with an associated triggering rule of the one or more triggering rules. For example, a triggering rule associated with the number of participants can include a threshold number of participants (e.g., a threshold) of 5 participants. Based on the comparing, it is determined that that number of participants satisfies the associated triggering rule. For example, the number of participants associated with the electronic message (e.g., 7 participants) satisfies the associated triggering rule (e.g., greater than the threshold number of 5 participants). In response, a suggestion is provided to an author associated with the electronic message (e.g., a user providing content to the electronic message) to convert the electronic message to a format of the collaboration communications system 204.

In some examples, the collaboration plugin 218 compares two or more characteristics of the electronic message with two or more respective associated triggering rules. For example, based on the comparison, it is determined that one of the characteristics of the two or more characteristics of the electronic message (e.g., email message) satisfies the respective associated triggering rule. In some examples, in response to at least one characteristic satisfying the respective triggering rule, the suggestion is provided to an author associated with the electronic message (e.g., a user providing content to the electronic message) to convert the electronic message to a format of the collaboration communications system 204. In some examples, in response to at least one characteristic not satisfying the respective triggering rule, the suggestion is not provided to an author associated with the electronic message (e.g., a user providing content to the electronic message) to convert the electronic message to a format of the collaboration communications system 204.

Additionally, in some examples, based on the comparison, it is determined that both of the characteristics of the two or more characteristics of the electronic message satisfy the respective associated triggering rules. In some examples, in response to at both characteristics satisfying the respective triggering rules, the suggestion is provided to an author associated with the electronic message (e.g., a user providing content to the electronic message) to convert the electronic message (e.g., email message) to a format of the collaboration communications system 204.

In some implementations, based on the comparing, the content of the electronic message is converted to a format of the collaboration communications system. Specifically, in some examples, the collaboration plugin 218 converts the content of the electronic message (e.g., email message) to a format of the collaboration communications system 202. Specifically, the message communications system 202 may be associated with a first format (e.g., an email-based format), and the collaboration communications system 202 may be associated with a second (different) format (e.g., a collaboration-based format). In some examples, the collaboration communications system 202 may be unable to process (or having limited processing capability) associated with the electronic message and/or the first format of the electronic message. For example, the collaboration communications system 202 may be unable to appropriately display the electronic message including appropriate collaboration information within a GUI of the collaboration communications system 202.

In some examples, converting the content of the electronic message to a format of the collaboration communications system 202 includes associating one or more collaboration properties with the electronic message. For example, the properties can include embedded replies (e.g., comment boxes) associated with each communication within the electronic message (e.g., a multi-threaded electronic message). For example, the properties can include thread-based properties, message-board properties, topic-based properties, and/or discussion group-based properties. In some examples, the format of the collaboration communications system 202 can include a tree-based structure (e.g., a root node and children nodes). For example, each communication within the electronic message (e.g., email message) can act as a root node, and responses to the communication (e.g., embedded replies) act as children nodes. In some examples, the format of the collaboration communication system 202 can include sorting the communications with the electronic message based on the content of each communication (e.g., grouped together, or filtered). In some examples, converting the content of the electronic message to a format of the collaboration communications system 202 is based on a particular type (e.g., system, platform) of the collaboration communications system 202

In some implementations, a collaboration message is prepared that is employed within the collaboration communications system for electronic transmission that includes the converted content of the electronic message. Specifically, in some examples, the collaboration plugin 218 prepares the collaboration message employed within the collaboration communications system 204 for electronic transmission. For example, preparing the collaboration message includes providing the converted content of the electronic message (e.g., email message) to the collaboration server 212 over a network (e.g., network 130). In some examples, the converted content of the electronic message includes is provided through a Web service and/or an Open Data Protocol (OData).

In some examples, the collaboration plugin 218, the collaboration server computing system 212, or both prepare the collaboration message. In some examples, the collaboration message includes a message that is accessible by the collaboration communications system 204, and is able to be appropriately processed by the collaboration communications system 204. For example, a user of the collaboration communications system 204 is able to interact with the collaboration message. In some examples, the collaboration message is also accessible by the email client 210, and is able to be processed by the mail client 210, described further below. For example, a user of the mail client 210 is able to interact with the collaboration message.

In some examples, the collaboration message is displayable within a GUI of the collaboration communications system 204. In some examples, the collaboration message is displayable within a GUI of the mail client 210, and specifically, within a graphical representation of the electronic message, described further below. In some examples, the collaboration message includes a group-based message, a discussion-based message, or a document-sharing based message.

In some examples, the collaboration client 216 can provide the collaboration message to a user of the collaboration communications system 204. The collaboration client 216 is in communication with the collaboration server 212 (e.g., over the network 130), and receives the collaboration message from the collaboration server 212. Additionally, the collaboration server 212 is in communication with the collaboration data store 214 (e.g., over the network 130). The collaboration data store 214 stores the collaboration message. For example, the collaboration data stores 214 further stores metadata associated with collaboration messages, or other collaboration-based data.

In some further implementations, an update is received to the content of the electronic message. In some examples, a user of the message communications system 202, the collaboration communications system 204, or both, provides the update to the content of the electronic message (e.g., email message). The update to the content of the electronic message can include an update to the body of the electronic message, a reply (or forward) of the electronic message, a comment (or reply) of one or more particular communications of the electronic messages, or other interaction. In some examples, the user directly updates the collaboration message.

In response to the receiving the update, the collaboration message is updated to include the updated content. In some examples, the updated content of the electronic message is identified, and provided to the collaboration sever 212 to update the collaboration message. That is, the format of the updated content of the electronic message is converted to the format of the collaboration communication systems 204, as discussed above.

In some examples, updating the content of the collaboration message to include the updated content can include identifying a message identifier (ID) associated with the electronic message and identifying a collaboration identifier (ID) associated with the collaboration message. To that end, a mapping is provided between the message ID and the collaboration ID. Specifically, the mail data store 208 includes a mail-to-collaboration ID map 220. The map 220 stores mappings between message IDs associated with electronic messages and collaboration IDs associated with collaboration message (e.g., in a database, or a table). In some examples, a particular message ID can map to multiple collaboration IDs. In some examples, a particular collaboration ID can map to multiple message IDs. Based on the particular mapping associated with the message ID, the respective associated collaboration ID is identified. The collaboration message associated with the collaboration ID is further identified, and updated to include the updated content.

In some further implementations, a first group of users is identified that are associated with the message communications system 202, and a second (differing) group of users associated with the collaboration communications system 204. In some examples, the first group of users are not associated with the collaboration communications system 204. In some examples, the second group of users are not associated with the message communications system 202.

In some further implementations, based on the suggestion provided to the author (e.g., user), an indication is received from the author (e.g., of the electronic message) to convert the content. For example, the author can select the aforementioned hyperlink. Based on receiving the indication, the content of the electronic message (e.g., email message) is converted to the format of the collaboration communications system 204. In some examples, the author can further select a portion of the electronic message to convert such that the portion of the content of the electronic message is converted to the format of the collaboration communications system 204. For example, the portion can include a particular communication of the electronic message, or a particular thread of the electronic message.

In some further implementations, the collaboration message is displayed within the message communications system 202. Specifically, the collaboration message is displayed within a GUI associated with the mail client 210. In some examples, a user associated with the message communications system 202 (e.g., a user interacting with the mail client 210) can interact with the collaboration message such as adding replies to particular communications or threads of the collaboration message. In some examples, the message communications systems 202 emulates the collaboration communications system 204 such that the user can interact with the collaboration message through the message communication systems 202 in substantially the same way as through the collaboration communications system 204.

In some further implementations, at least one of the one or more characteristics of the electronic message is compared to one or more collaboration rules. For example, the collaboration rules define parameters for collaboration messages. That is, a collaboration message is associated with parameters that define a collaboration message. In other words, the electronic message (e.g., email message) is deemed "fit or not" for a collaboration platform. For example, the collaboration rules can include rules pertaining to metadata of the electronic message. To that end, by comparing the characteristics of the electronic message to the collaboration rules, it is determined whether the electronic message satisfies the collaboration rules. When it is determined that the electronic message satisfies the collaboration rules, the collaboration message is provided in response. However, when it is determined that the electronic message does not satisfy the collaboration rules, the collaboration message is not provided and/or a warning message can provided to the user (or author) associated with the electronic message in response.

Figure 3A:
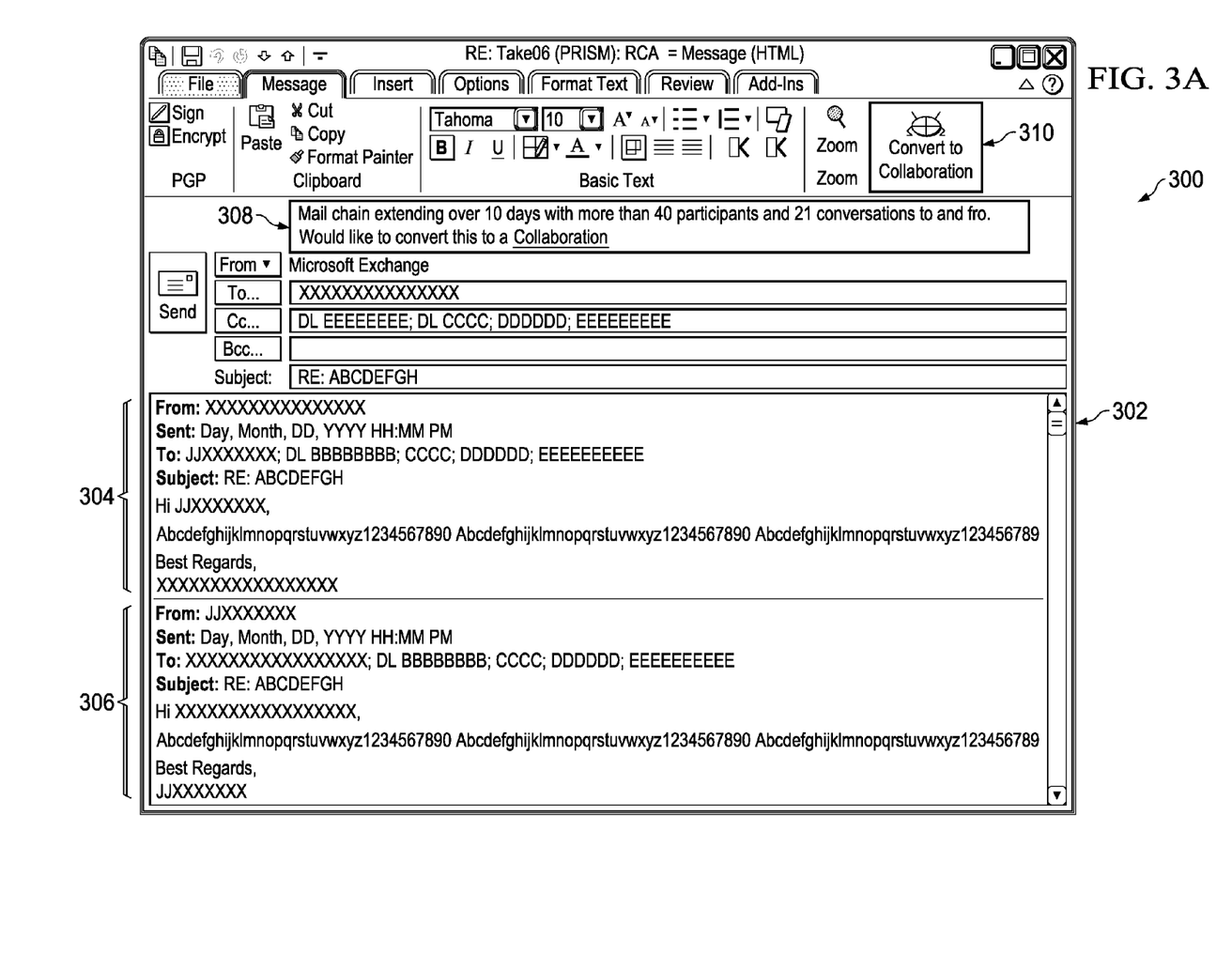
FIGS. 3A-3B illustrate an example graphical user interface for a message-based collaboration.

FIGS. 3A and 3B illustrates an example graphical user interface (GUI) 300 of the mail client 210. Specifically, FIG. 3A illustrates the GUI 300 of the mail client 210 including an electronic message 302 (e.g., email message). The electronic message 302 includes communications 304, 306, however, the electronic message 302 can include any number of communications. To that end, the system 200, and in some examples, the collaboration plugin 218, provides a suggestion 308 to convert the electronic message 302 to a format of the collaboration communications system 204. Specifically, the suggestion 308 includes text describing one or more characteristics of the electronic message 302 that satisfy one or more triggering rules. For example, the suggestion 308 includes the text "Mail chain extending over 10 days with more than 40 participants and 21 conversations to and fro. Would you like to convert this to a Collaboration?" To that end, the text "Collaboration" can include a hyperlink to an external website to facilitate converting the electronic message 302 to the format of the collaboration communications system 204. In some examples, the mail client 210 further includes a selectable action user interface element 310 for, when selected, converting the electronic message 302 to the format of the collaboration communications system 204.

Figure 3B:
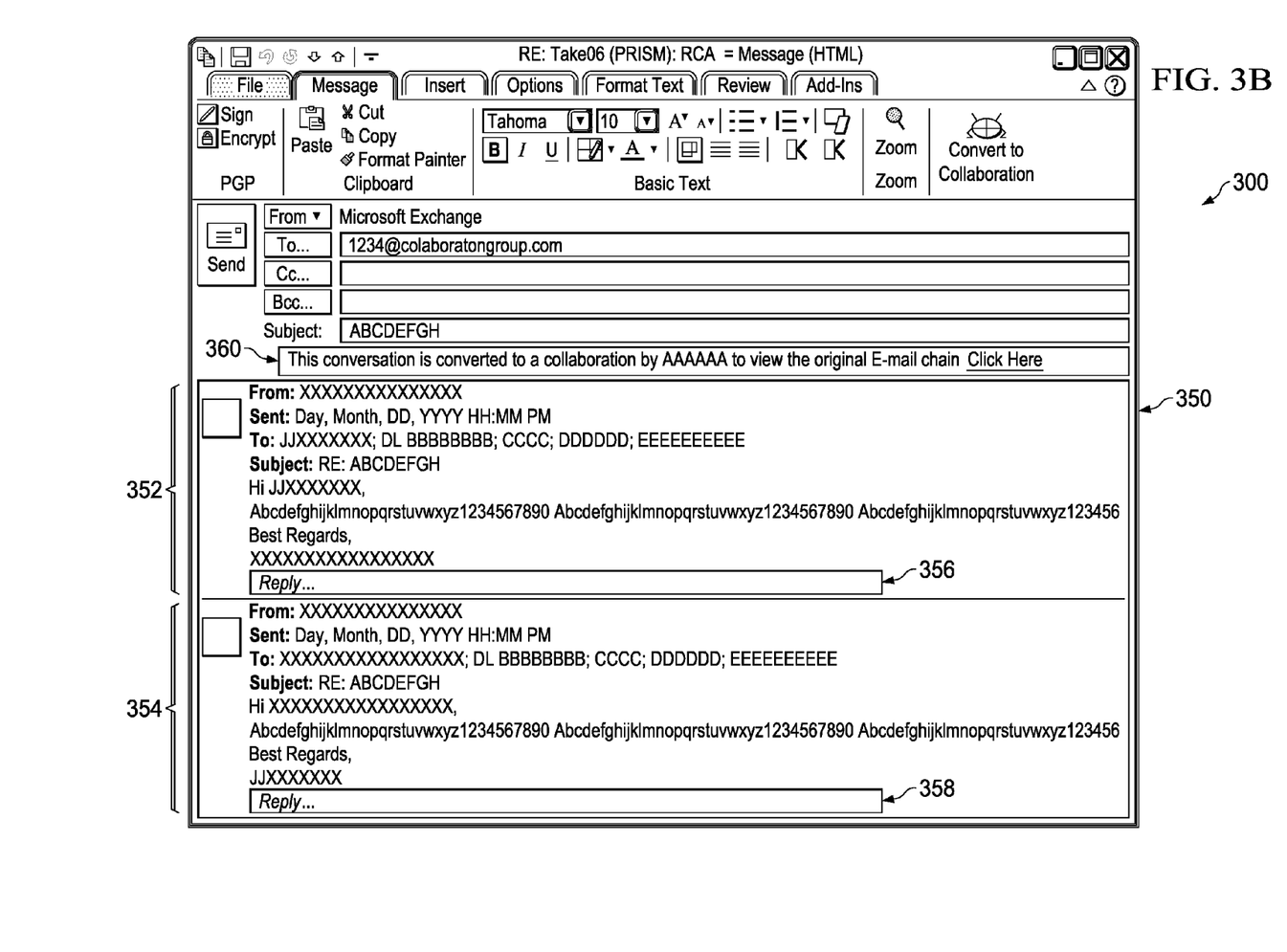

FIG. 3B illustrates the GUI 300 of the mail client 210 including a collaboration message 350. Specifically, the collaboration message 350 includes the converted content of the electronic message 302, and includes threads 352, 354, however, the collaboration message 350 can include any number of threads. In some examples, the threads 352, 354 can include reply interface elements 356, 358, respectively, for a user to provide replies directed to the respective thread 352, 354. In some examples, the "look and feel" of the collaboration message 350 is consistent with the "look and feel" of the electronic message 302. In some examples, the collaboration message 350 further includes a status 360 indicating that the collaboration message 350 is a collaboration message and a hyperlink to view the electronic message 302.

Figure 4:
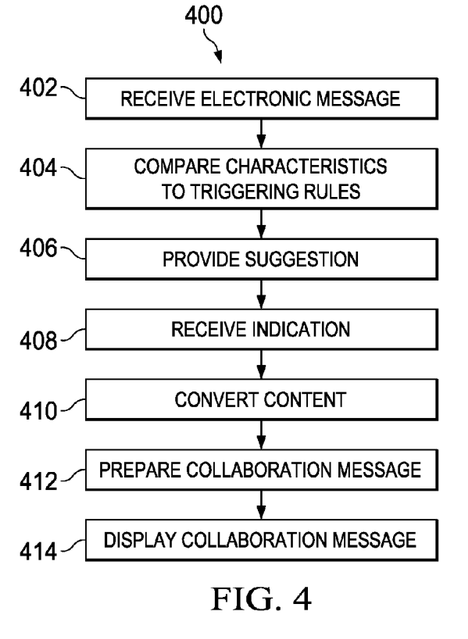
FIGS. 4-9 illustrates flow charts of a method for message-based collaborations.

FIG. 4 illustrates a flow chart of a method for providing a message-based (e.g., email-based collaboration). For clarity of presentation, the description that follows generally describes method 400 in the context of FIGS. 1 and 2. For example, as illustrated, particular steps of the method 400 may be performed on or at an enterprise system, cloud-based system, and/or on-demand system, while other particular steps may be performed on or at a client system or on-premise system. However, method 400 may be performed, for example, by any other suitable system, environment, software, and hardware, or a combination of systems, environments, software, and hardware as appropriate.

At step 402, an electronic message is received from the message communications system 202. In some examples, the electronic message includes content and is associated with one or more characteristics. At step 404, at least one of the one or more characteristics of the electronic message is compared to one or more triggering rules. At step 406, based on the comparing, a suggestion is provided to an author associated with the electronic message to convert the content of the electronic message to the format of the collaboration communications system 204. At step 408, based on the suggestion, an indication to convert the content is received from the author. At step 410, based on the indication, the content of the electronic message is converted to the format of the collaboration communications system 204. At step 412, a collaboration message employed within the collaboration communications system 204 is prepared for electronic transmission that includes the converted content of the electronic message. At step 414, the collaboration message is displayed within the message communications system 202.

Figure 5:
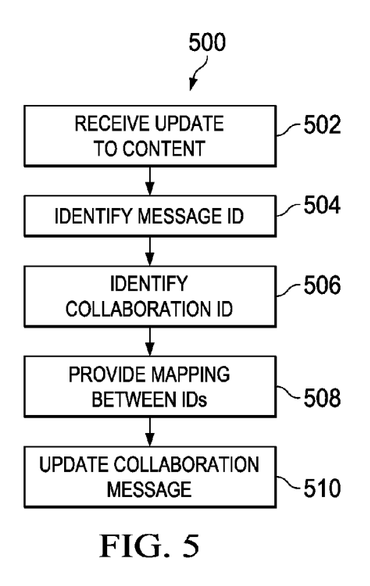

FIG. 5 illustrates a flow chart of a method for updating content of the collaboration message. For clarity of presentation, the description that follows generally describes method 500 in the context of FIGS. 1 and 2. For example, as illustrated, particular steps of the method 500 may be performed on or at an enterprise system, cloud-based system, and/or on-demand system, while other particular steps may be performed on or at a client system or on-premise system. However, method 500 may be performed, for example, by any other suitable system, environment, software, and hardware, or a combination of systems, environments, software, and hardware as appropriate.

At step 502, an update to the content of the electronic message is received. At step 504, a message identifier (ID) associated with the electronic message is identified. At step 506, a collaboration identifier (ID) associated with the collaboration message is identified. At step 508, a mapping between the message ID and the collaboration ID is provided. At step 510, the collaboration message is updated to include the updated content based on the mapping.

Figure 6:
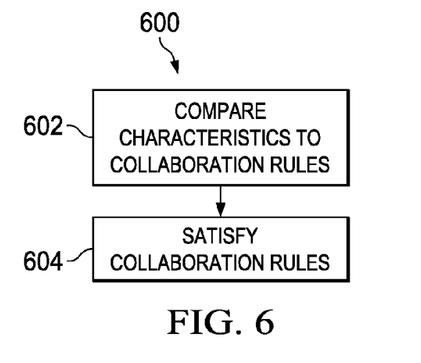

FIG. 6 illustrates a flow chart of a method for determining whether the electronic message is suitable for a collaboration platform. For clarity of presentation, the description that follows generally describes method 600 in the context of FIGS. 1 and 2. For example, as illustrated, particular steps of the method 600 may be performed on or at an enterprise system, cloud-based system, and/or on-demand system, while other particular steps may be performed on or at a client system or on-premise system. However, method 600 may be performed, for example, by any other suitable system, environment, software, and hardware, or a combination of systems, environments, software, and hardware as appropriate.

At step 602, at least one of the one more characteristics of the electronic message is compared to one or more collaboration rules. In some examples, the collaboration rules define parameters for collaboration messages. At step 604, based on the comparing, the electronic message is determined to satisfy the collaboration rules. At step 606, in response to the determination, the collaboration message is provided.

Figure 7:
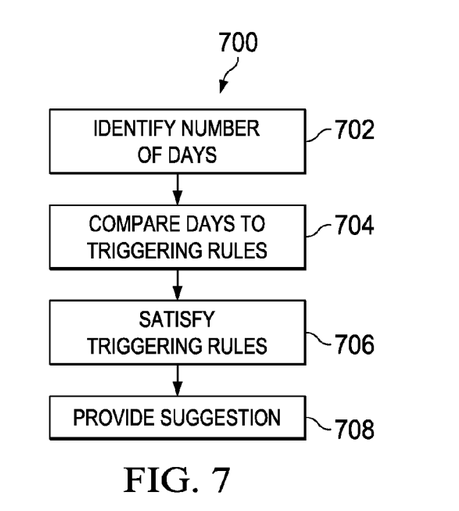

FIG. 7 illustrates a flow chart of a method for providing a message-based (e.g., email-based) collaboration based on triggering rules. For clarity of presentation, the description that follows generally describes method 700 in the context of FIGS. 1 and 2. For example, as illustrated, particular steps of the method 700 may be performed on or at an enterprise system, cloud-based system, and/or on-demand system, while other particular steps may be performed on or at a client system or on-premise system. However, method 700 may be performed, for example, by any other suitable system, environment, software, and hardware, or a combination of systems, environments, software, and hardware as appropriate.

At step 702, a number of days associated with the electronic message is identified. At step 704, the number of days is compared with an associated triggering rule of the one or more triggering rules. At step 706, based on the comparing, the number of days is determined to satisfy the associated triggering rule. At step 708, a suggestion is provided to an author associated with the electronic message to convert the electronic message to the format of the collaboration communications system.

Figure 8:
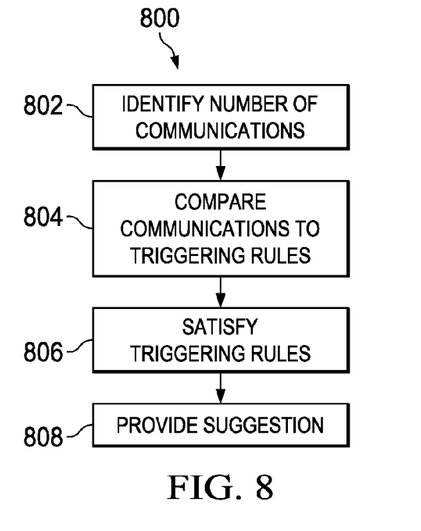

FIG. 8 illustrates a flow chart of a method for providing a message-based (e.g., email-based) collaboration based on triggering rules. For clarity of presentation, the description that follows generally describes method 800 in the context of FIGS. 1 and 2. For example, as illustrated, particular steps of the method 800 may be performed on or at an enterprise system, cloud-based system, and/or on-demand system, while other particular steps may be performed on or at a client system or on-premise system. However, method 800 may be performed, for example, by any other suitable system, environment, software, and hardware, or a combination of systems, environments, software, and hardware as appropriate.

At step 802, a number of a total number of communications associated with the electronic message is identified. At step 804, the number of communications is compared with an associated triggering rule of the one or more triggering rules. At step 806, based on the comparing, the number of communications is determined to satisfy the associated triggering rule. At step 808, a suggestion is provided to an author associated with the electronic message to convert the electronic message to the format of the collaboration communications system.

Figure 9:
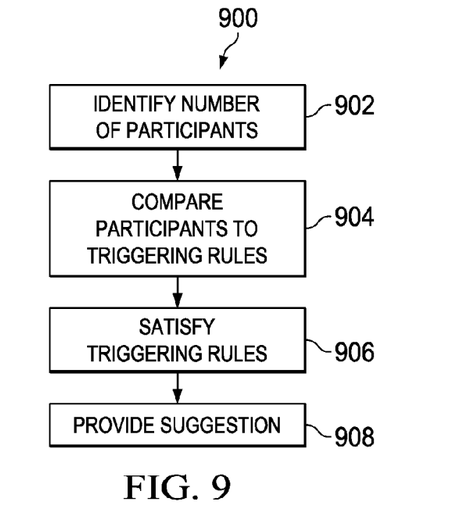

FIG. 9 illustrates a flow chart of a method for providing a message-based (e.g., email-based) collaboration based on triggering rules. For clarity of presentation, the description that follows generally describes method 900 in the context of FIGS. 1 and 2. For example, as illustrated, particular steps of the method 900 may be performed on or at an enterprise system, cloud-based system, and/or on-demand system, while other particular steps may be performed on or at a client system or on-premise system. However, method 900 may be performed, for example, by any other suitable system, environment, software, and hardware, or a combination of systems, environments, software, and hardware as appropriate.

At step 902, a number of a total number of participants associated with the electronic message is identified. At step 904, the number of participants is compared with an associated triggering rule of the one or more triggering rules. At step 906, based on the comparing, the number of participants is determined to satisfy the associated triggering rule. At step 908, a suggestion is provided to an author associated with the electronic message to convert the electronic message to the format of the collaboration communications system.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, e.g., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order (e.g., FIGS. 4-9), this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results. Accordingly, the above description of example implementations does not define or constrain this disclosure. Other changes, substitutions, and alterations are also possible without departing from the spirit and scope of this disclosure.

What is claimed is:

1. A computer-implemented method for providing a message-based collaboration, the method comprising:
   receiving, from a message communications system, an electronic message, the electronic message including content, and associated with one or more characteristics, the electronic message including an initial communication and a plurality of responsive communications to the initial communication;
   comparing at least one of the one or more characteristics of the electronic message to one or more triggering rules;
   based on the comparing, providing a suggestion to an author associated with the electronic message to convert the content of the electronic message to the format of the collaboration communications system, the suggestion including i) a text-based description of the one or more characteristics that satisfies at least one of the one or more triggering rules and ii) a hyperlink to an external website;
   based on the suggestion, receiving, from the author, a selection of the hyperlink;
   in response to the selection of the hyperlink, converting the content of the electronic message to a format of a collaboration communications system utilizing the hyperlink, the converting including:
   determining the format of the collaboration communication system includes a tree-based structure, and
   in response to the determining, providing the initial communication of the electronic message as a root node of the tree-based structure and the plurality of responsive communications each as a child node of the tree-based structure;
   comparing at least one of the one more characteristics of the electronic message to one or more collaboration rules, the collaboration rules defining parameters for collaboration messages;
   based on the comparing, determining the electronic message satisfies the collaboration rules, and in response, preparing a collaboration message employed within the collaboration communications system for electronic transmission, the collaboration message including the converted content of the electronic message; and
   displaying the collaboration message within the message communications system, the message communication system configured to emulate the collaboration communications system such that interaction with the collaboration message within the message communication system includes embedded replies associated with each communication within the collaboration message.

2. The computer-implemented method of claim 1, further comprising receiving an update to the content of the electronic message, and in response, updating the collaboration message to include the updated content.

3. The computer-implemented method of claim 2, further comprising: identifying a message identifier (ID) associated with the electronic message; identifying a collaboration identifier (ID) associated with the collaboration message; providing a mapping between the message ID and the collaboration ID; and updating the collaboration message to include the updated content based on the mapping.

4. The computer-implemented method of claim 1, wherein comparing at least one of the one or more characteristics of the electronic message to one or more triggering rules further comprises: identifying a number of days associated with the electronic message; comparing the number of days with an associated trigger rule of the one or more triggering rules; and based on the comparing, determining the number of days satisfies the associated triggering rule, and in response, providing a suggestion to an author associated with the electronic message to convert the electronic message to the format of the collaboration communications system.

5. The computer-implemented method of claim 1, wherein comparing at least one of the one or more characteristics of the electronic message to one or more triggering rules further comprises: identifying a number of a total number of communications associated with the electronic message; comparing the number of communications with an associated triggering rule of the one or more triggering rules; and based on the comparing, determining the number of communications satisfies the associated triggering rule, and in response, providing a suggestion to an author associated with the electronic message to convert the electronic message to the format of the collaboration communications system.

6. The computer-implemented method of claim 1, wherein comparing at least one of the one or more characteristics of the electronic message to one or more triggering rules further comprises: identifying a number of a total number of participants associated with the electronic message; comparing the number of participants with an associated triggering rule of the one or more triggering rules; and based on the comparing, determining the number of participants satisfies the associated triggering rule, and in response, providing a suggestion to an author associated with the electronic message to convert the electronic message to the format of the collaboration communications system.

7. The computer-implemented method of claim 1, further comprising displaying the collaboration message within the message communications system.

8. The computer-implemented method of claim 1, further comprising: based on the suggestion, receiving, from the author, i) a selection of the hyperlink and ii) a selection of a portion of the electronic message; in response to the selection of the hyperlink, converting the portion of the content of the electronic message to the format of the collaboration communications system utilizing the hyperlink.

9. The computer-implemented method of claim 8, wherein the portion of the electronic message is a particular communication of the electronic message.

10. The computer-implemented method of claim 8, wherein the portion of the electronic message is a particular thread of the electronic message.

11. A computer program product encoded on a non-transitory storage medium, the product comprising non-transitory, computer readable instructions for causing one or more processors to perform operations comprising:
receiving, from a message communications system, an electronic message, the electronic message including content, and associated with one or more characteristics, the electronic message including an initial communication and a plurality of responsive communications to the initial communication;
comparing at least one of the one or more characteristics of the electronic message to one or more triggering rules;
based on the comparing, providing a suggestion to an author associated with the electronic message to convert the content of the electronic message to the format of the collaboration communications system, the suggestion including i) a text-based description of the one or more characteristics that satisfies at least one of the one or more triggering rules and ii) a hyperlink to an external website;
based on the suggestion, receiving, from the author, a selection of the hyperlink;
in response to the selection of the hyperlink, converting the content of the electronic message to a format of a collaboration communications system utilizing the hyperlink, the converting including:
determining the format of the collaboration communication system includes a tree-based structure, and
in response to the determining, providing the initial communication of the electronic message as a root node of the tree-based structure and the plurality of responsive communications each as a child node of the tree-based structure;
comparing at least one of the one more characteristics of the electronic message to one or more collaboration rules, the collaboration rules defining parameters for collaboration messages;
based on the comparing, determining the electronic message satisfies the collaboration rules, and in response, preparing a collaboration message employed within the collaboration communications system for electronic transmission, the collaboration message including the converted content of the electronic message; and
displaying the collaboration message within the message communications system, the message communication system configured to emulate the collaboration communications system such that interaction with the collaboration message within the message communication system includes embedded replies associated with each communication within the collaboration message.

12. The computer program product of claim 10, the operations further comprising receiving an update to the content of the electronic message, and in response, updating the collaboration message to include the updated content.

13. The computer program product of claim 11, the operations further comprising: identifying a message identifier (ID) associated with the electronic message; identifying a collaboration identifier (ID) associated with the collaboration message; providing a mapping between the message ID and the collaboration ID; and updating the collaboration message to include the updated content based on the mapping.

14. The computer program product of claim 10, wherein comparing at least one of the one or more characteristics of the electronic message to one or more triggering rules further comprises: identifying a number of days associated with the electronic message; comparing the number of days with an associated trigger rule of the one or more triggering rules; and based on the comparing, determining the number of days satisfies the associated triggering rule, and in response, providing a suggestion to an author associated with the electronic message to convert the electronic message to the format of the collaboration communications system.

15. The computer program product of claim 10, wherein comparing at least one of the one or more characteristics of the electronic message to one or more triggering rules further comprises: identifying a number of a total number of communications associated with the electronic message; comparing the number of communications with an associated triggering rule of the one or more triggering rules; and based on the comparing, determining the number of communications satisfies the associated triggering rule, and in response, providing a suggestion to an author associated with the electronic message to convert the electronic message to the format of the collaboration communications system.

16. The computer program product of claim 10, wherein comparing at least one of the one or more characteristics of the electronic message to one or more triggering rules further comprises: identifying a number of a total number of participants associated with the electronic message; comparing the number of participants with an associated triggering rule of the one or more triggering rules; and based on the comparing, determining the number of participants satisfies the associated triggering rule, and in response, providing a suggestion to an author associated with the electronic message to convert the electronic message to the format of the collaboration communications system.

17. A system comprising: one or more computers; and
a computer-readable medium coupled to the one or more computers having instructions stored thereon which, when executed by the one or more computers, cause the one or more computers to perform operations comprising:
receiving an electronic message, the electronic message including content, and associated with one or more characteristics, the electronic message including an initial communication and a plurality of responsive communications to the initial communication;
comparing at least one of the one or more characteristics of the electronic message to one or more triggering rules;
based on the comparing, providing a suggestion to an author associated with the electronic message to convert the content of the electronic message to the format of the collaboration communications system, the suggestion including i) a text-based description of the one or more characteristics that satisfies at least one of the one or more triggering rules and ii) a hyperlink to an external website;

based on the suggestion, receiving, from the author, a selection of the hyperlink; in response to the selection of the hyperlink, converting the content of the electronic message to a format of a collaboration communications system utilizing the hyperlink, the converting including:

determining the format of the collaboration communication system includes a tree-based structure, and in response to the determining, providing the initial communication of the electronic message as a root node of the tree-based structure and the plurality of responsive communications each as a child node of the tree-based structure;

comparing at least one of the one more characteristics of the electronic message to one or more collaboration rules, the collaboration rules defining parameters for collaboration messages;

based on the comparing, determining the electronic message satisfies the collaboration rules, and in response, preparing a collaboration message employed within the collaboration communications system for electronic transmission, the collaboration message including the converted content of the electronic message; and displaying the collaboration message within the message communications system, the message communication system configured to emulate the collaboration communications system such that interaction with the collaboration message within the message communication system includes embedded replies associated with each communication within the collaboration message.

18. The system of claim 17, the operations further comprising receiving an update to the content of the electronic message, and in response, updating the collaboration message to include the updated content.

19. The system of claim 17, the operations further comprising: identifying a message identifier (ID) associated with the electronic message; identifying a collaboration identifier (ID) associated with the collaboration message; providing a mapping between the message ID and the collaboration ID; and updating the collaboration message to include the updated content based on the mapping.

* * * * *